Mar. 6, 1923. 1,447,706
A. G. BARSAMIAN
AUTOMATIC RETAINING AND RELEASE VALVE FOR AIR BRAKES
Filed Oct. 6, 1921
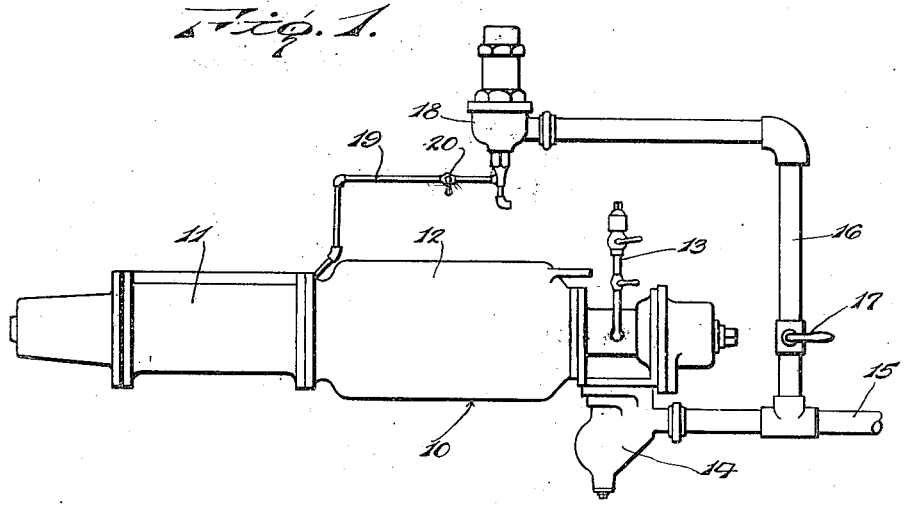
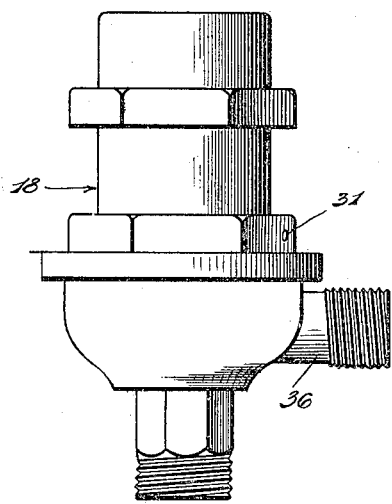
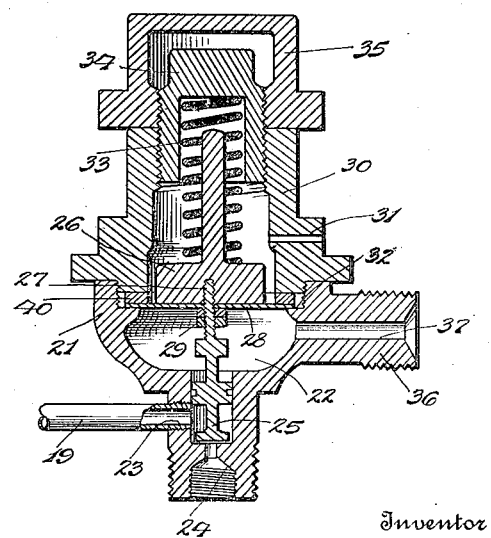

Patented Mar. 6, 1923.

1,447,706

UNITED STATES PATENT OFFICE.

ALFRED G. BARSAMIAN, OF SEATTLE, WASHINGTON.

AUTOMATIC RETAINING AND RELEASE VALVE FOR AIR BRAKES.

Application filed October 6, 1921. Serial No. 505,886.

*To all whom it may concern:*

Be it known that I, ALFRED G. BARSAMIAN, a citizen of the United States, residing at Seattle, in the county of King and State of Washington, have invented certain new and useful Improvements in Automatic Retaining and Release Valves for Air Brakes, of which the following is a specification.

My invention relates to automatic retaining and release valves for air brake systems. In the operation of heavy trains on long down grades, it is very difficult to keep the speed under control, because the brakes cannot be held on for very long periods. It is therefore necessary to again apply the brakes at intervals by a series of reductions of the pressure in the brake pipe on the train. This repeated application of the brakes with the consequent reductions of the air pressure, results in the loss of air pressure in the auxiliary reservoirs before the train has reached the bottom of the down grade. It therefore becomes necessary to release the brakes by increasing the train pipe pressure, in order that the auxiliary reservoir may be recharged. This is a very dangerous undertaking on steep down grades for the reason, that a heavy train might attain such high speed before the brakes can again be applied, that the engineer may entirely lose control of the train.

To guard against these occurrences, retaining valves are usually attached to the exhaust ports of the valves. The purpose of these retaining valves is to hold a certain predetermined pressure on the brakes, while the auxiliary reservoirs are being recharged. In ordinary service these retaining valves are rendered inactive by being left open to the atmosphere, but when the train approaches a long down grade, it is then necessary for the train crew to close these retaining valves in each car of the train. This, being a rather difficult and dangerous process, is often neglected and heavy trains are thus permitted to attain uncontrollable speeds.

The object of this invention is now to obviate these difficulties by first enabling the engineer to control the brake cylinder pressure from his cab and to eliminate the retaining valves. Another object is to retain the brake cylinder pressure while recharging the train pipe and the auxiliary reservoir. A third object is to maintain the brake pipe pressure at all times regardless of the brake cylinder pressure and by this means to obtain an increase in the braking power, and it is impossible to overcharge a train of any denomination because the valve requires just so much air during a release, including the over-charge, due to the frictional resistance of a long brake pipe. It should also be noted that I obtain a graduated release on freight as well as passenger trains. Lastly, an object is also to provide safer operation of railroad trains by means of the air brakes than what is now possible, by preventing an engineer from wasting air due to improper manipulation of the brake valve.

These objects are attained by means of a mechanism illustrated in the accompanying drawing:

Figure 1 illustrates a typical air brake unit as ordinarily installed on freight cars and with an automatic retainer and release valve attached;

Figure 2 is a side elevation of the device; and

Figure 3 is a vertical section through the same.

The air brake unit 10 consists of a brake cylinder 11, an auxiliary reservoir 12 with an exhaust port 13 for the unit having a suitable cock for closing and opening the same, a triple valve 14 and a train pipe 15 for the compressed air.

To this unit is now attached a shunt pipe 16 branching out from the main train pipe 15 and provided with a cock 17 for opening or closing the shunt pipe. At the end of this shunt pipe 16 I attach my retainer and release valve 18 which is connected to the brake cylinder 11 through the pipe 19 with the cock 20.

The body 21 of the valve 18 is provided with an enlarged chamber 22, which has an inlet port 23, to which pipe 19 is attached and an exhaust port 24 leading to the atmosphere. This exhaust port 24 is controlled by a valve piston 25 which is secured by means of threads or any other suitable means to a plunger 26. This plunger has a flat faced lower end, against which a diaphragm 28 is locked by means of retaining nuts 29 on the stem of the valve piston 25. It will thus be seen that the piston 25, the plunger 26, and the diaphragm 28 are held rigidly together.

Into the upper end of the valve body 21 is threaded a barrel 30 which is drawn up tight against a packing ring 40 in the seat 32. The barrel 30 is provided with an air vent 31 leading from its hollow interior. At its top is inserted, by means of threads, a plug 34, between which and the upper side of the plunger 26 a coiled compression spring 33 is inserted and acting downwardly so as to press the diaphragm 28 against its seat 32 in the body 21, thereby closing the chamber 22. A cap 35, is intended to screw down tightly against the top of the barrel 30 and serve as a lock nut for the plug 34, after the latter has been set as required and on which it is threaded. The shunt pipe 16 is attached to a neck 36 to one side of the body 21 and this neck has a passage 37 which leads into the chamber 22.

When installing the retainer and release valve in the air brake system, the downward pressure from the spring 33 is first adjusted by means of the plug 34, so that this pressure is slightly greater than the normal air pressure in the train brake pipe 15. This normal air pressure in the train brake pipe 15 is generally about seventy pounds per square inch and the diaphragm pressure consequently a few pounds over this. Ordinarily the exhaust port 13 from the triple valve is left open during the operation of a unit, but with my device installed, this port 13 is closed.

The operation of my device is as follows:

The compressed air from the train brake pipe 15 enters through passage 37 into chamber 22 as soon as cock 17 has been opened and the pressure is then confined under the diaphragm 28 in chamber 22 by means of compression spring 33, which exerts greater pressure downwardly on the diaphragm than the normal pressure in chamber 22 and in the train brake pipe. The cock 20 on the connecting pipe 19, leading from the brake cylinder 11, is next opened, so that air from the brake cylinder may escape to the atmosphere through exhaust port 24 whenever the valve piston 25 is lifted from its seat.

In order to apply the brakes, air pressure in the train brake pipe 15 is reduced. As a consequence the pressure in chamber 22 will also be reduced so that the exhaust port 24 remains closed, thereby retaining any pressure that may be in the brake cylinder. If now the brake cylinder pressure is below that in the auxiliary reservoir, air will go from the auxiliary reservoir 12 into the brake cylinder 11 by way of the triple valve 14, until an equilibrium is reached and the action is then exactly the same as in ordinary brake units. As, however the exhaust port 13 is closed, air cannot exhaust from the brake cylinder except through pipe 19 and port 23 past piston 25 and through exhaust port 24. Hence, to release the brakes, it is necessary to increase the air pressure in the train brake pipe 15, thereby also increasing the pressure in chamber 22 until the piston controlling the exhaust port 24 is lifted, which is almost instantly, because the brake pipe and auxiliary reservoirs are practically always charged regardless of the brake cylinder pressure. This then allows the air from the brake cylinder 11 to escape through exhaust port 24 instead of through the triple valve exhaust port 13, which has already been closed, as previously stated.

It will now be evident, since the train pipe is charged with pressure below that exerted by the spring 33 upon the diaphragm 28, that the valve piston 25 may be kept closed, thereby holding the brake set, while the auxiliary reservoirs are being charged. It will also be noted, that all of the changes in the air pressure are made directly by the engineer in the usual way, without the manipulation by the train crew of the formerly used retaining valves situated in the different cars composing the train.

I want to emphasize that my retainer and release valve, which is automatic in its action, can be applied to any existing brake systems now in use, and which valve eliminates the manually operated retaining valves commonly used and all the danger accompanying the manipulation of the same.

Having thus described the invention what is claimed as new is:

1. In an automatic retainer and release valve for fluid pressure in a cylinder, a body having an inlet port and a normally closed exhaust port for the fluid in said cylinder and means actuated by the change in fluid pressure from a pressure source for opening said exhaust port.

2. In an automatic retainer and release valve for fluid pressure in a cylinder, a body having an inlet port and a normally closed exhaust port for the fluid, a chamber being provided in said body having connection with a fluid pressure source, a piston covering said exhaust port, means adapted to seat said piston and including an element opposing the pressure of said fluid pressure source.

3. In combination with an air brake having a brake cylinder, an auxiliary air reservoir and a train brake pipe adapted to charge said reservoir; of a shunt conduit on said train brake pipe, a normally closed automatic retainer and release valve in said shunt conduit, a pipe connection between said release valve and said brake cylinder; the air pressure in said conduit, upon exceeding the normal line pressure, adapted to open said automatic retainer and release valve to exhaust from said brake cylinder.

4. In combination with an air brake having a brake cylinder, an auxiliary air reservoir and a train brake pipe; of a valve body having an inlet port, an exhaust port and a pressure chamber, a conduit from said train brake pipe opening into said pressure chamber, a pipe connection between said brake cylinder and said inlet port, a valve piston for said exhaust port, a diaphragm attached to said valve piston, a seat in said chamber for said diaphragm and means for exerting pressure against said diaphragm counteracting the pressure in said chamber, said means comprising a plug adjustable in axial direction of said valve piston and a compression spring inserted between said plug and said diaphragm.

In testimony whereof I affix my signature.

ALFRED G. BARSAMIAN. [L. S.]